United States Patent
Gao et al.

(10) Patent No.: US 12,473,387 B2
(45) Date of Patent: Nov. 18, 2025

(54) COPOLYMER OF OLEFIN AND UNSATURATED CARBOXYLIC ACID OR UNSATURATED CARBOXYLIC ACID DERIVATIVE

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Rong Gao, Beijing (CN); Zifang Guo, Beijing (CN); Junling Zhou, Beijing (CN); Dongbing Liu, Beijing (CN); Jie Fu, Beijing (CN); Jingjing Lai, Beijing (CN); Tingjie Huang, Beijing (CN); Shiyuan Xu, Beijing (CN); Xinyang Li, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 188 days.

(21) Appl. No.: 18/304,743

(22) Filed: Apr. 21, 2023

(65) Prior Publication Data

US 2023/0257499 A1 Aug. 17, 2023

Related U.S. Application Data

(62) Division of application No. 16/759,153, filed as application No. PCT/CN2018/111685 on Oct. 24, 2018, now abandoned.

(30) Foreign Application Priority Data

Oct. 24, 2017 (CN) .......................... 201711008111.7

(51) Int. Cl.
- C08F 220/04 (2006.01)
- C08F 210/02 (2006.01)
- C08J 9/16 (2006.01)

(52) U.S. Cl.
CPC .......... *C08F 220/04* (2013.01); *C08F 210/02* (2013.01); *C08J 9/16* (2013.01); *C08J 2205/04* (2013.01); *C08J 2323/08* (2013.01); *C08J 2333/02* (2013.01)

(58) Field of Classification Search
CPC .................................................... C08F 220/04
See application file for complete search history.

(56) References Cited

U.S. PATENT DOCUMENTS

| | | | |
|---|---|---|---|
| 4,460,477 A | 7/1984 | Costello et al. | |
| 5,221,651 A | 6/1993 | Sacchetti et al. | |
| 5,866,663 A * | 2/1999 | Brookhart | C08F 210/14 526/348 |
| 6,306,986 B1 * | 10/2001 | Teasley | C08F 10/00 502/155 |
| 6,593,437 B1 * | 7/2003 | Gonioukh | C07F 17/02 526/171 |
| 6,670,433 B2 * | 12/2003 | McLain | C08F 132/04 526/236 |
| 2002/0072571 A1 | 6/2002 | Cohen et al. | |
| 2002/0156207 A1 * | 10/2002 | Imuta | C08L 53/00 526/127 |
| 2004/0110903 A1 | 6/2004 | Matsugi et al. | |
| 2005/0131143 A1 | 6/2005 | Ugazio | |
| 2006/0223944 A1 | 10/2006 | Fujita et al. | |
| 2007/0049712 A1 | 3/2007 | Allen et al. | |
| 2018/0016367 A1 * | 1/2018 | Aida | C07F 15/045 |

FOREIGN PATENT DOCUMENTS

| | | |
|---|---|---|
| CN | 101182365 A | 5/2008 |
| CN | 101679565 A | 3/2010 |
| CN | 103304718 A | 9/2013 |
| CN | 103524653 A | 1/2014 |
| CN | 103709540 A | 4/2014 |
| CN | 105061505 A | 11/2015 |

OTHER PUBLICATIONS

WO2016136892 (Year: 2016).*

* cited by examiner

*Primary Examiner* — Irina Krylova
(74) *Attorney, Agent, or Firm* — NKL Law; Allen Xue

(57) ABSTRACT

A preparation method for a copolymer includes the step(s) of contacting an olefin and an unsaturated carboxylic acid shown in Formula II or a derivative of the unsaturated carboxylic acid shown in Formula II with a catalyst and optionally a chain transfer agent for reaction in the presence of an alkane solvent to obtain the copolymer. The copolymer is a spherical and/or spherical-like copolymer.

14 Claims, 2 Drawing Sheets

COPOLYMER OF OLEFIN AND UNSATURATED CARBOXYLIC ACID OR UNSATURATED CARBOXYLIC ACID DERIVATIVE

FIELD OF THE INVENTION

The present disclosure relates to the technical field of olefin polymerization, and in particular, to a copolymer of an olefin and an unsaturated carboxylic acid or an unsaturated carboxylic acid derivative.

BACKGROUND OF THE INVENTION

Polyolefin products are inexpensive, have excellent performance, and have a wide range of applications. Under the condition that original excellent physical and chemical properties of polyolefin are retained, the introduction of polar groups into the molecular chain of polyolefin through a chemical synthesis method can improve chemical inertness, dyeing property, wettability, and compatibility with other materials thereof, giving new characteristics that raw materials do not have thereto.

The copolymerization method and the grafting method are main mature methods for preparing a copolymer having a polar group. High-pressure radical polymerization is mostly used in the copolymerization method to promote the copolymerization of an olefin and an olefin monomer having a polar group. Although polar monomers can be directly introduced into the polyolefin chain by using high-pressure radical copolymerization, this method requires high-temperature and high-pressure conditions, high energy consumption, and expensive equipment costs.

Coordination catalysis copolymerization, as a polymer preparation technology at room temperature and atmospheric pressure, has received widespread attention for its significant role in reducing energy consumption and improving reaction efficiency. The participation of the catalyst in the reaction process greatly reduces the activation energy of the copolymerization reaction of olefin monomers and polar monomers, which is conducive to obtaining functional polymers having a higher molecular weight at lower temperatures and pressures. Currently, only a small amount of literature reports the use of transition metal complexes to catalyze the copolymerization of the olefin and the unsaturated carboxylic acid. However, in the existing technologies, no matter which method is used for the polymerization reaction, obtained polymers are all thick sticky lumpy solids, which are easy to scale in the polymerization equipment, causing difficulties in polymer transportation, solvent removal, and granulation.

SUMMARY OF THE INVENTION

The present disclosure provides a copolymer of an olefin and an unsaturated carboxylic acid or an unsaturated carboxylic acid derivative, and the copolymer includes a spherical and/or spherical-like polymer. The spherical and/or spherical-like polymer may be obtained by direct polymerization of an olefin and an unsaturated carboxylic acid or a derivative thereof, and subsequent processing such as granulation is not needed. The copolymer exhibits a good morphology and has good prospects in industrial use.

According to a first aspect of the present disclosure, a copolymer of olefin and unsaturated carboxylic acid or unsaturated carboxylic acid derivative is provided, which includes a spherical and/or spherical-like polymer.

According to a preferred embodiment of the present invention, in the copolymer, at least part of spherical and/or spherical-like polymers have a cavity therein.

According to a preferred embodiment of the present invention, the copolymer includes a structural unit derived from olefin and a structural unit of Formula I or a structural unit of a derivative of Formula I,

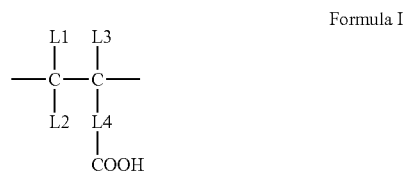

Formula I wherein in Formula I, L1-L3 each are independently selected from the group consisting of H and $C_1$-$C_{30}$ alkyl, and L4 is $C_1$-$C_{30}$ alkylene having a side group; the derivative of Formula I is a IIA, IIIA or IIB Group metal salt of Formula I; and the $C_1$-$C_{30}$ alkyl is optionally substituted by a substituent, and preferably the substituent is one or more selected from the group consisting of halogen, $C_1$-$C_{10}$ alkyl, $C_1$-$C_{10}$ alkoxy, $C_6$-$C_{10}$ aryl, cyano group and carboxyl.

According to a preferred embodiment of the present invention, the side group in L4 is one or more selected from the group consisting of halogen, $C_6$-$C_{20}$ aryl, $C_1$-$C_{20}$ alkyl and $C_1$-$C_{20}$ alkoxy. The $C_6$-$C_{20}$ aryl, $C_1$-$C_{20}$ alkyl, and $C_1$-$C_{20}$ alkoxy are optionally substituted by a substituent, and preferably the substituent is one or more selected from the group consisting of halogen, $C_1$-$C_{10}$ alkyl, $C_1$-$C_{10}$ alkoxy, $C_6$-$C_{10}$ aryl and carboxyl.

According to a preferred embodiment of the present invention, the side group in L4 is one or more selected from the group consisting of halogen, $C_6$-$C_{20}$ aryl, $C_1$-$C_{20}$ alkyl, $C_1$-$C_{20}$ alkyl substituted by carboxyl, and $C_1$-$C_{20}$ alkyl substituted by alkoxy. Preferably, the side group is one or more selected from the group consisting of halogen, $C_6$-$C_{20}$ aryl, $C_1$-$C_{20}$ alkyl, $C_1$-$C_{10}$ alkyl substituted by carboxyl, and $C_1$-$C_{10}$ alkyl substituted by alkoxy. More preferably, the side group is one or more selected from the group consisting of halogen, $C_6$-$C_{10}$ aryl, and $C_1$-$C_{10}$ alkyl. Further preferably, the side group is one or more selected from the group consisting of halogen, phenyl, and $C_1$-$C_6$ alkyl. Examples of the $C_1$-$C_6$ alkyl include methyl, ethyl, n-propyl, isopropyl, n-butyl, isobutyl, tert-butyl, pentyl and hexyl.

According to a preferred embodiment of the present invention, in Formula I, L1 and L2 are H, L3 being H or $C_1$-$C_{30}$ alkyl, L4 being $C_1$-$C_{30}$ alkylene having a side group. The $C_1$-$C_{30}$ alkyl is optionally substituted by a substituent, and preferably the substituent is one or more selected from the group consisting of halogen, $C_1$-$C_{10}$ alkyl, $C_1$-$C_{10}$ alkoxy, $C_6$-$C_{10}$ aryl, cyano group and carboxyl.

According to a preferred embodiment of the present invention, in Formula I, L1 and L2 are H, L3 is H, $C_1$-$C_{10}$ alkyl or $C_1$-$C_{10}$ alkyl substituted by halogen, preferably L3 is H or $C_1$-$C_{10}$ alkyl; and L4 is $C_1$-$C_{20}$ alkylene having a side group. For example, L4 is methylene having a side group, ethylidene having a side group, propylidene having a side group, butylidene having a side group, $C_5$ alkylene having a side group, $C_6$ alkylene having a side group, $C_7$ alkylene having a side group, $C_8$ alkylene having a side group, $C_9$ alkylene having a side group, $C_{10}$ alkylene having a side group, $C_{12}$ alkylene having a side group, $C_{14}$ alkylene having a side group, $C_{18}$ alkylene having a side group, and $C_{20}$ alkylene having a side group. Preferably L4 is $C_1$-$C_{10}$ alkylene having a side group.

According to a preferred embodiment of the present invention, in Formula I, L1 and L2 are H, L3 is H or $C_1$-$C_{10}$ alkyl; and L4 is $C_1$-$C_{10}$ alkylene having a side group.

According to a preferred embodiment of the present invention, in Formula I, L1 and L2 are H, L3 is H or $C_1$-$C_6$ alkyl (such as methyl, ethyl, propyl, butyl, pentyl and hexyl); and L4 is $C_1$-$C_{10}$ alkylene having a side group.

In the present invention, the carbon number n of Cn alkylene refers to the number of C on the linear chain, excluding the number of C on the side group. For example, isopropylidene (—$CH_2$—$CH(CH_3)$—) in the present invention is called $C_2$ alkylene having a side group (methyl).

According to a preferred embodiment of the present invention, a density of the spherical and/or spherical-like polymer is in a range of 0.3000-0.8500 g/cm³. For example, the density may be 0.3000 g/cm³, 0.3500 g/cm³, 0.4000 g/cm³, 0.4500 g/cm³, 0.5000 g/cm³, 0.5500 g/cm³, 0.6000 g/cm³, 0.6500 g/cm³, 0.7000 g/cm³, 0.7500 g/cm³, 0.8000 g/cm³, 0.8500 g/cm³, or any value between them. Preferably, the density is in a range of 0.4000-0.7500 g/cm³. The density is measured by using a method in GB/T6463-2009.

According to a preferred embodiment of the present invention, an average particle size of the spherical and/or spherical-like polymer is in a range of 0.1-50.0 mm. For example, the particle size may be 0.1 mm, 0.5 mm, 1.0 mm, 2.0 mm, 3.0 mm, 5.0 mm, 8.0 mm, 10.0 mm, 15.0 mm, 20.0 mm, 25.0 mm, 30.0 mm, 35.0 mm, 40.0 mm, 45.0 mm, 50.0 mm, or any value between them. Preferably, the average particle size is in a range of 0.5-20.0 mm.

According to a preferred embodiment of the present invention, the volume of the cavity in the spherical and/or spherical-like polymer having a cavity therein is 5-99% of a volume of the spherical and/or spherical-like polymer. For example, the volume of the cavity may be 5%, 8%, 10%, 15%, 20%, 25%, 30%, 35%, 40%, 45%, 50%, 60%, 70%, 80%, 90%, 95%, 99%, or any value between them, of the volume of the spherical and/or spherical-like polymer. Preferably, the volume of the cavity is 30-95% of the volume of the spherical and/or spherical-like polymer. More preferably, the volume of the cavity is 50-90% of the volume of the spherical and/or spherical-like polymer.

According to a preferred embodiment of the present invention, the spherical and/or spherical-like polymer having a cavity therein is a polymer of a core-shell structure. The cavity is the core, and a polymer layer wrapping the cavity is the shell. According to a preferred embodiment of the present invention, the cavity is spherical and/or spherical-like.

According to a preferred embodiment of the present invention, in the copolymer, a content of the structural unit of Formula I or the structural unit of the derivative of Formula I is in a range of 0.2-15.0 mol %. For example, the content may be 0.2 mol %, 0.4 mol %, 0.5 mol %, 0.7 mol %, 0.8 mol %, 1.0 mol %, 1.5 mol %, 2.0 mol %, 3.0 mol %, 4.0 mol %, 5.0 mol %, 8.0 mol %, 9.0 mol %, 10.0 mol %, 11.0 mol %, 12.0 mol %, 13.0 mol %, 14.0 mol %, 15.0 mol %, or any value between them. Preferably, the content is in a range of 0.4-10.0 mol %.

According to a preferred embodiment of the present invention, a number-average molecular weight of the copolymer is in a range of 5000-200000, preferably in a range of 15000-150000.

According to a preferred embodiment of the present invention, a melting point is in a range of 45-130° C. For example, the melting point is 45° C., 50° C., 60° C., 70° C., 80° C., 90° C., 100° C., 110° C., 120° C., 130° C., or any value between them.

According to a preferred embodiment of the present invention, the structural unit derived from the olefin includes a structural unit derived from $C_2$-$C_{16}$ olefin, and preferably is selected from a structural unit derived from $C_2$-$C_{16}$ α-olefin or from $C_3$-$C_{16}$ cycloolefin.

According to a preferred embodiment of the present invention, the α-olefin or the cycloolefin is monoolefine. For example, the structural unit derived from the olefin may be a structural unit derived from one or more of ethylene, propylene, 1-butene, 1-pentene, 1-hexene, 1-heptene, and 1-octene.

According to a preferred embodiment of the present invention, the IIA Group metal is Mg or Ca, preferably Mg; the IIIA Group metal is Al or Ga, preferably Al; and the IIB Group metal is Zn or Cd, preferably Zn.

According to another aspect of the present disclosure, a preparation method for the copolymer of olefin and unsaturated carboxylic acid or unsaturated carboxylic acid derivative is provided. The preparation method includes contacting an olefin and an unsaturated carboxylic acid shown in Formula II or a derivative of the unsaturated carboxylic acid shown in Formula II with a catalyst and optionally a chain transfer agent for reaction in the presence of an alkane solvent to obtain the copolymer;

Formula II wherein in Formula II, definitions of L1-L4 are the same as the definitions of L1-L4 in Formula I, and the derivative of the unsaturated carboxylic acid refers to a IIA, IIIA, or IIB Group metal salt of the unsaturated carboxylic acid; and the catalyst includes a main catalyst and a co-catalyst, and the main catalyst is a metal complex shown in Formula III:

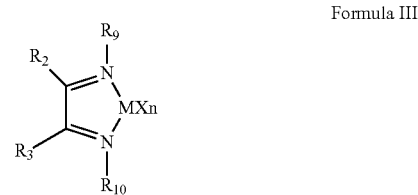

Formula III wherein in Formula III, $R_9$ and $R_{10}$ are identical to or different from each other, and each are independently selected from substituted or unsubstituted hydrocarbyl; $R_2$ and $R_3$ are identical to or different from each other, each are independently selected from the group consisting of H, halogen, and substituted or unsubstituted hydrocarbyl, and $R_2$ and $R_3$ optionally form a ring with each other; M is a Group VIII metal; X is one or more selected from the group consisting of halogen, hydrocarbyl and hydrocarbyloxy, and is preferably one or more selected from the group consisting of halogen and $C_1$-$C_{10}$ alkyl; and n is an integer that meets an M valence state.

According to a preferred embodiment of the present invention, $R_9$ and $R_{10}$ each are independently selected from the group consisting of substituted or unsubstituted aryl and substituted or unsubstituted aralkyl, and are preferably selected from the group consisting of substituted or unsubstituted $C_6$-$C_{30}$ aryl and substituted or unsubstituted $C_7$-$C_{30}$ aralkyl. Preferably, $R_9$ and $R_{10}$ each are independently selected from the group consisting of $C_6$-$C_{30}$ aryl substituted by $C_1$-$C_{10}$ hydrocarbyl and $C_6$-$C_{30}$ aryl substituted by $C_1$-$C_{10}$ hydrocarbyloxy, and are preferably selected from the group consisting of phenyl substituted by $C_1$-$C_{10}$ hydrocarbyl, and phenyl substituted by $C_1$-$C_{10}$ hydrocarbyloxy, for example, phenyl substituted by methyl, ethyl, isopropyl, n-propyl, isobutyl, n-butyl, tert-butyl, methoxyl, ethoxyl, isopropoxyl, n-propoxyl, isobutoxyl, n-butoxyl and/or tert-butoxyl.

According to a preferred embodiment of the present invention, the main catalyst is a metal complex shown in Formula IV:

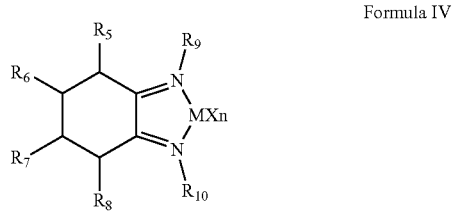

Formula IV wherein in Formula IV, $R_9$, $R_{10}$, M, X, and n have the same definitions as those in Formula III; and $R_5$-$R_8$ are identical to or different from each other, each are independently selected from the group consisting of H, halogen, and substituted or unsubstituted $C_1$-$C_{20}$ hydrocarbyl, and $R_5$-$R_8$ optionally form a ring with each other.

According to a preferred embodiment of the present invention, in Formula IV, $R_5$-$R_8$ are identical to or different from each other, each are independently selected from the group consisting of H and $C_1$-$C_{20}$ hydrocarbyl, and $R_5$-$R_8$ optionally form a ring with each other. Preferably, $R_5$-$R_8$ are identical to or different from each other, each are independently selected from the group consisting of H and $C_1$-$C_6$ alkyl, and preferably form a ring by bonding; and M is a VIII Group metal, and X is selected from halogen.

According to a preferred embodiment of the present invention, the main catalyst is a metal complex shown in Formula V:

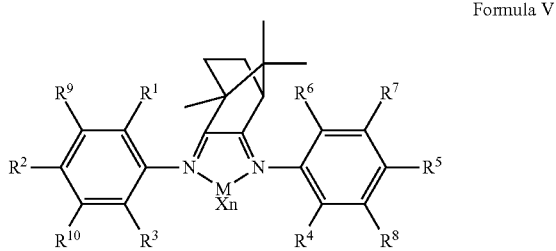

Formula V wherein in Formula V, $R^1$-$R^{10}$ are identical to or different from each other, and each are independently selected from the group consisting of H, halogen, $C_1$-$C_{24}$ hydrocarbyl and $C_1$-$C_{24}$ hydrocarbyloxy, $R^1$-$R^3$, $R^9$, and $R^{10}$ optionally forming a ring to each other, $R^4$-$R^6$, $R^7$, and $R^8$ optionally forming a ring to each other; and M, X and n have the same definitions as those in Formula III and Formula IV.

According to a preferred embodiment of the present invention, in Formula III Formula IV and Formula V, the M is nickel.

According to a preferred embodiment of the present invention, the X is halogen, and is preferably Br or Cl.

According to a preferred embodiment of the present invention, in Formula V, $R^1$-$R^{10}$ are identical to or different from each other, each are independently selected from the group consisting of H and $C_1$-$C_{10}$ alkyl, and are preferably selected from the group consisting of H and $C_1$-$C_6$ alkyl. Preferably, $R^7$-$R^{10}$ are H, and $R^1$-$R^6$ are identical to or different from each other and each are independently selected from the group consisting of H and $C_1$-$C_6$ alkyl; and more preferably, $R^7$-$R^{10}$ are H, and $R^1$-$R^6$ are identical to or different from each other and each are independently selected from the group consisting of H and $C_1$-$C_4$ alkyl (including methyl, ethyl, n-propyl, isopropyl, butyl).

According to a preferred embodiment of the present invention, the main catalyst is one or more selected from the group consisting of the following complexes: Complex 1, in Formula V, $R^1$-$R^6$ are all methyl, and $R^7$-$R^{10}$ are H;

Complex 2, in Formula V, $R^1$-$R^6$ are all ethyl, and $R^7$-$R^{10}$ are H;

Complex 3, in Formula V, $R^1$-$R^6$ are all isopropyl, and $R^7$-$R^{10}$ are H;

Complex 4, in Formula V, $R^1$-$R^6$ are all n-propyl, and $R^7$-$R^{10}$ are H;

Complex 5, in Formula V, $R^1$-$R^6$ are all butyl, and $R^7$-$R^{10}$ are H;

Complex 6, in Formula V, $R^1$, $R^3$, $R^4$, $R^6$ are all methyl, and $R^2$, $R^5$, $R^7$-$R^{10}$ are H;

Complex 7, in Formula V, $R^1$, $R^3$, $R^4$, $R^6$ are all ethyl, and $R^2$, $R^5$, $R^7$-$R^{10}$ are H;

Complex 8, in Formula V, $R^1$, $R^3$, $R^4$, $R^6$ are all n-propyl, and $R^2$, $R^5$, $R^7$-$R^{10}$ are H;

Complex 9, in Formula V, $R^1$, $R^3$, $R^4$, $R^6$ are all isopropyl, and $R^2$, $R^5$, $R^7$-$R^{10}$ are H;

Complex 10, in Formula V, $R^1$, $R^3$, $R^4$, $R^6$ are all butyl, and $R^2$, $R^5$, $R^7$-$R^{10}$ are H.

According to a preferred embodiment of the present invention, the main catalyst is selected from at least one of a compound shown in Formula a, a compound shown in Formula b and a compound shown in Formula c:

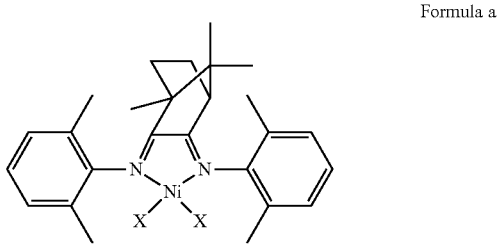

Formula a

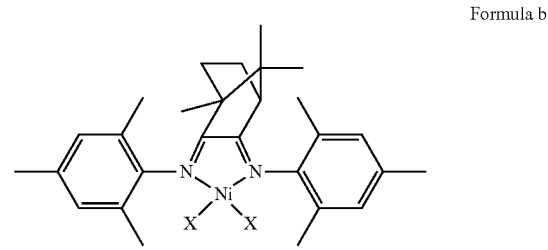

Formula b

Formula c

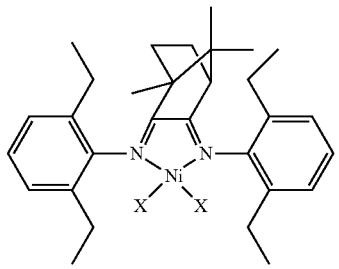

in Formula a, Formula b and Formula c, X represents Br or Cl.

According to a preferred embodiment of the present invention, the main catalyst is selected from at least one of complex a1, complex b1 and complex c1.

complex a1

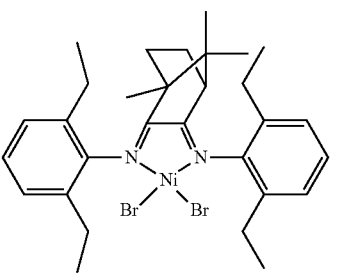

complex b1

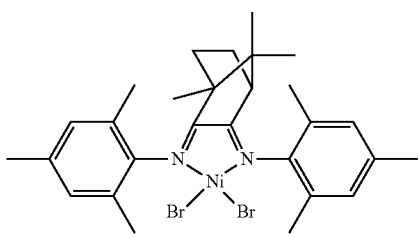

complex c1

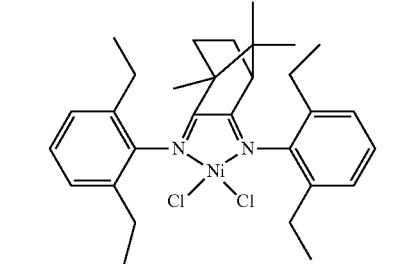

According to a preferred embodiment of the present invention, a concentration of the main catalyst in the reaction system is in a range of 0.00001-100 mmol/L. For example, the concentration may be 0.00001 mmol/L, 0.00005 mmol/L, 0.0001 mmol/L, 0.0005 mmol/L, 0.001 mmol/L, 0.005 mmol/L, 0.01 mmol/L, 0.05 mmol/L, 0.1 mmol/L, 0.3 mmol/L, 0.5 mmol/L, 0.8 mmol/L, 1 mmol/L, 5 mmol/L, 8 mmol/L, 10 mmol/L, 20 mmol/L, 30 mmol/L, 50 mmol/L, 70 mmol/L, 80 mmol/L, 100 mmol/L, or any value between them. Preferably, the concentration is in a range of 0.0001-1 mmol/L. More preferably, the concentration of the main catalyst in the reaction system is in a range of 0.001-0.5 mmol/L.

According to a preferred embodiment of the present invention, the co-catalyst is selected from the group consisting of an organic aluminum compound and an organic boron compound.

According to a preferred embodiment of the present invention, the organic aluminum compound is selected from the group consisting of an alkyl aluminoxane or an organic aluminum compound having a general formula $AlR_nX^1_{3-n}$ (alkylaluminum or alkylaluminum halides). In the general formula $AlR_nX^1_{3-n}$, R is H, $C_1$-$C_{20}$ hydrocarbyl or $C_1$-$C_{20}$ hydrocarbyloxy, and is preferably $C_1$-$C_{20}$ alkyl, $C_1$-$C_{20}$ alkoxy, $C_7$-$C_{20}$ aralkyl, or $C_6$-$C_{20}$ aryl; and $X^1$ is halogen, and is preferably chlorine or bromine; and $0<n\leq 3$. Specific examples of the organic aluminum compound include, but are not limited to, trimethylaluminum, triethylaluminum, triisobutylaluminum, tri-n-hexylaluminum, trioctylaluminum, diethylaluminum monohydrogen, diisobutylaluminum monohydrogen, diethylaluminum monochloride, diisobutylaluminum monochloride, ethylaluminum sesquichloride, ethylaluminum dichloride, methylaluminoxane (MAO) and modified methylaluminoxane (MMAO). Preferably, the organic aluminum compound is methylaluminoxane (MAO).

According to a preferred embodiment of the present disclosure, the organic boron compound is selected from aryl boron and/or borate. The aryl boron is preferably substituted or unsubstituted phenylboron, and is more preferably tris(pentafluorophenyl) boron. The borate is preferably N, N-dimethylanilinium tetrakis (pentafluorophenyl) borate and/or triphenylmethylium tetrakis (pentafluorophenyl) borate.

According to a preferred embodiment of the present invention, when the co-catalyst is the organic aluminum compound, a molar ratio of aluminum in the co-catalyst and M in the main catalyst is in range of (10-10000000):1. Preferably, the molar ratio is 10:1, 20:1, 50:1, 100:1, 200:1, 300:1, 500:1, 700:1, 800:1, 1000:1, 2000:1, 3000:1, 5000:1, 10000:1, 100000:1, 1000000:1, 10000000:1, or any value between them. Preferably, the molar ratio is in range of (10-100000):1. More preferably, the molar ratio is in range of (100-10000):1. When the co-catalyst is the organic boron compound, a molar ratio of boron in the co-catalyst and M in the main catalyst is in range of (0.1-1000):1. For example, the molar ratio is 0.1:1, 0.2:1, 0.5:1, 1:1, 2:1, 3:1, 5:1, 8:1, 10:1, 20:1, 50:1, 100:1, 200:1, 300:1, 500:1, 700:1, 800:1, 1000:1, or any value between them. Preferably, the molar ratio is in range of (0.1-500):1.

In some embodiments of the present disclosure, the olefin is $C_2$-$C_{16}$ olefin, and preferably the olefin is ethylene or α-olefin having 3-16 carbon atoms.

In other embodiments of the present disclosure, the olefin is $C_3$-$C_{16}$ cycloolefin, and is preferably a 5-membered or 6-membered cycloolefin.

According to a preferred embodiment of the present invention, specific examples of the unsaturated carboxylic acid shown in Formula II include, but are not limited to, 2-methyl-4-pentenoic acid, 2,3-dimethyl-4-pentenoic acid, 2,2-dimethyl-4-pentenoic acid, 2-ethyl-4-pentenoic acid, 2-isopropyl-4-pentenoic acid, 2,2,3-trimethyl-4-pentenoic acid, 2,3,3-trimethyl-4-pentenoic acid, 2-ethyl-3-methyl-4-pentenoic acid, 2-(2-methylpropyl)-4-pentenoic acid, 2,2-diethyl-4-pentenoic acid, 2-methyl-2-ethyl-4-pentenoic acid, 2,2,3,3-tetramethyl-4-pentenoic acid, 2-methyl-5-hexenoic acid, 2-ethyl-5-hexenoic acid, 2-propyl-5-hexenoic acid, 2,3-dimethyl-5-hexenoic acid, 2,2-dimethyl-5-hexenoic acid, 2-isopropyl-5-hexenoic acid, 2-methyl-2-ethyl-5-hexenoic acid, 2-(1-methylpropyl)-5-hexenoic acid, 2,2, 3-trimethyl-5-hexenoic acid, 2,2-diethyl-5-hexenoic acid, 2-methyl-6-heptenoic acid, 2-ethyl-6-heptenoic acid, 2-propyl-6-heptenoic acid, 2,3-dimethyl-6-heptenoic acid, 2,4-dimethyl-6-heptenoic acid, 2,2-dimethyl-6-heptenoic acid, 2-isopropyl-5-methyl-6-heptenoic acid, 2-isopropyl-6-heptenoic acid, 2,3,4-trimethyl-6-heptenoic acid, 2-methyl-2-ethyl-6-heptenoic acid, 2-(1-methylpropyl)-6-heptenoic acid, 2,2,3-trimethyl-6-heptenoic acid, 2,2-diethyl-6-heptenoic acid, 2-methyl-7-octenoic acid, 2-ethyl-7-octenoic acid, 2-propyl-7-octenoic acid, 2,3-dimethyl-7-octenoic acid, 2,4-dimethyl-7-octenoic acid, 2,2-dimethyl-7-octenoic acid, 2-isopropyl-5-methyl-7-octenoic acid, 2-isopropyl-7-octenoic acid, 2,3,4-trimethyl-7-octenoic acid, 2-methyl-2-ethyl-7-octenoic acid, 2-(1-methylpropyl)-7-octenoic acid, 2,2,3-trimethyl-7-octenoic acid, 2,2-diethyl-7-octenoic acid, 2-methyl-8-nonenoic acid, 2-ethyl-8-nonenoic acid, 2-propyl-8-nonenoic acid, 2,3-dimethyl-8-nonenoic acid, 2,4-dimethyl-8-nonenoic acid, 2,2-dimethyl-8-nonenoic acid, 2,2-diethyl-8-nonenoic acid, 2-isopropyl-5-methyl-8-nonenoic acid, 2-methyl-9-decenoic acid, 2,3-dimethyl-9-decenoic acid, 2,4-dimethyl-9-decenoic acid, or 2-methyl-10-undecylenic acid.

According to a preferred embodiment of the present invention, a concentration of the unsaturated carboxylic acid in Formula II or the derivative of the unsaturated carboxylic acid shown in Formula II in the reaction system is in a range of 0.01-6000 mmol/L, preferably in a range of 0.1-1000 mmol/L, more preferably in a range of 1-500 mmol/L. For example, the concentration may be 1 mmol/L, 10 mmol/L, 20 mmol/L, 30 mmol/L, 50 mmol/L, 70 mmol/L, 90 mmol/L, 100 mmol/L, 200 mmol/L, 300 mmol/L, 400 mmol/L, 500 mmol/L, or any value between them.

According to a preferred embodiment of the present invention, the chain transfer agent is one or more selected from the group consisting of aluminum alkyl, magnesium alkyl and zinc alkyl.

According to a preferred embodiment of the present invention, the chain transfer agent is trialkylaluminum and/or dialkyl zinc, and is preferably one or more selected from the group consisting of trimethylaluminum, triethylaluminum, triisopropylaluminum, triisobutylaluminum, tri-n-hexylaluminum, tri-n-octylaluminum, dimethylzinc and diethylzinc.

According to a preferred embodiment of the present invention, a molar ratio of the chain transfer agent and M in the main catalyst is in a range of (0.1-2000):1. For example, the molar ratio may be 0.1:1, 0.2:1, 0.5:1, 1:1, 2:1, 3:1, 5:1, 8:1, 10:1, 20:1, 50:1, 100:1, 200:1, 300:1, 500:1, 600:1, 800:1, 1000:1, 2000:1, and any value between them. Preferably, the molar ratio is (10-600):1.

According to a preferred embodiment of the present invention, the alkane solvent is one or more selected from the group consisting of $C_3$-$C_{20}$ alkane. For example, the alkane solvent may be one or more selected from the group consisting of butane, isobutane, pentane, hexane, heptane, octane, and cyclohexane. Preferably, the alkane solvent is one or more selected from the group consisting of hexane, heptane, and cyclohexane. It is found by the inventor, through research, that the spherical and/or spherical-like polymer can only be formed by the olefin and the unsaturated carboxylic acid or the derivative of the unsaturated carboxylic acid having a structure defined in the present application, and at least part of spherical and/or spherical-like polymers have a hallow structure.

According to a preferred embodiment of the present invention, the unsaturated carboxylic acid is subjected to a pre-processing of removing active hydrogen in advance. Preferably, the co-catalyst or the chain transfer agent above is used to perform a pre-processing to the unsaturated carboxylic acid so as to remove the active hydrogen in the unsaturated carboxylic acid, thereby forming the unsaturated carboxylic acid derivative, i.e., a IIA, IIIA, or IIB Group metal salt. Preferably, in the pre-processing process, a molar ratio of the carboxyl in the unsaturated carboxylic acid and the co-catalyst or the chain transfer agent is 10:1-1:10.

According to a preferred embodiment of the present invention, the reaction is performed under a condition that water and oxygen are excluded.

According to a preferred embodiment of the present invention, reaction conditions include: a reaction temperature ranging from −50° C. to 50° C., preferably −20-50° C., more preferably 0-50° C., for example, 0° C., 10° C., 20° C., 30° C., 40° C., 50° C., or any value between them; and/or a reaction time length of 10-200 min, preferably 20-60 min. It is founded by the inventor of the present application, through research, that a temperature within the above temperature range is beneficial for the preparation of the spherical and/or spherical-like polymer.

In the present invention, there is no particular limitation to the reaction pressure, and a pressure is acceptable as long as a coordination copolymerization reaction of monomers can be performed. When the olefin is ethylene, in order to reduce cost and simplify the polymerization process, in a reactor, a pressure for ethylene is preferably 1-1000 atm, further preferably 1-200 atm, more preferably 1-50 atm.

In the present disclosure, the "reaction system" refers to the entirety formed by the solvent, the olefin, the monomer of the unsaturated carboxylic acid or of unsaturated carboxylic acid derivative, the catalyst, and optionally the chain transfer agent.

In the present disclosure, the particle size of the spherical and/or spherical-like polymer herein is regarded as being equivalent to a diameter of a sphere having the same volume as the particle.

In the present disclosure, "substitute" in the wording of "substituted or unsubstituted" refers to the group defined thereby. For example, C or H atoms in the olefin or the alkane are optionally substituted by a substituent. The substituent is selected from halogen, hydrocarbyl (such as $C_1$-$C_{10}$ alkyl), oxo(—O—), and groups containing oxygen, nitrogen, boron, sulfur, phosphorus, silicon, germanium and tin atoms.

In the present disclosure, "hydrocarbyl" and "alkyl", unless otherwise stated, include linear-chain, branched-chain or cyclic "hydrocarbyl" and "alkyl". In the present disclosure, "hydrocarbyl", unless otherwise stated, includes aliphatic hydrocarbyl or aromatic hydrocarbyl, and aliphatic hydrocarbyl includes alkyl, olefin, and alkynyl.

According to another aspect of the present disclosure, a use of the copolymer of an olefin and an unsaturated carboxylic acid or an unsaturated carboxylic acid derivative as a foaming polyolefin material is provided.

In the present invention, by selecting unsaturated carboxylic acid monomers and catalysts for reaction and controlling a polymerization process, a spherical and/or spherical-like polymer having a good morphology is prepared. The obtained polymerization product is not easy to scale in the reactor and is convenient for transportation. At least part of the obtained spherical and/or spherical-like polymers have a hallow structure, can be used as a foaming material without undergoing a foaming process, and have good prospects in industrial use.

BRIEF DESCRIPTION OF THE DRAWINGS

The accompanying drawings are provided for further understanding to the present disclosure, constitute one part of the description, are used for explaining the present disclosure together with embodiments of the present disclosure, and do not constitute limitation to the present disclosure. In the drawings.

DETAILED DESCRIPTION OF THE EMBODIMENTS

Figure 1:
FIG. 1 is an electron micrograph of a spherical and/or spherical-like polymer obtained in Example 2 of the present invention.
Figure 2:
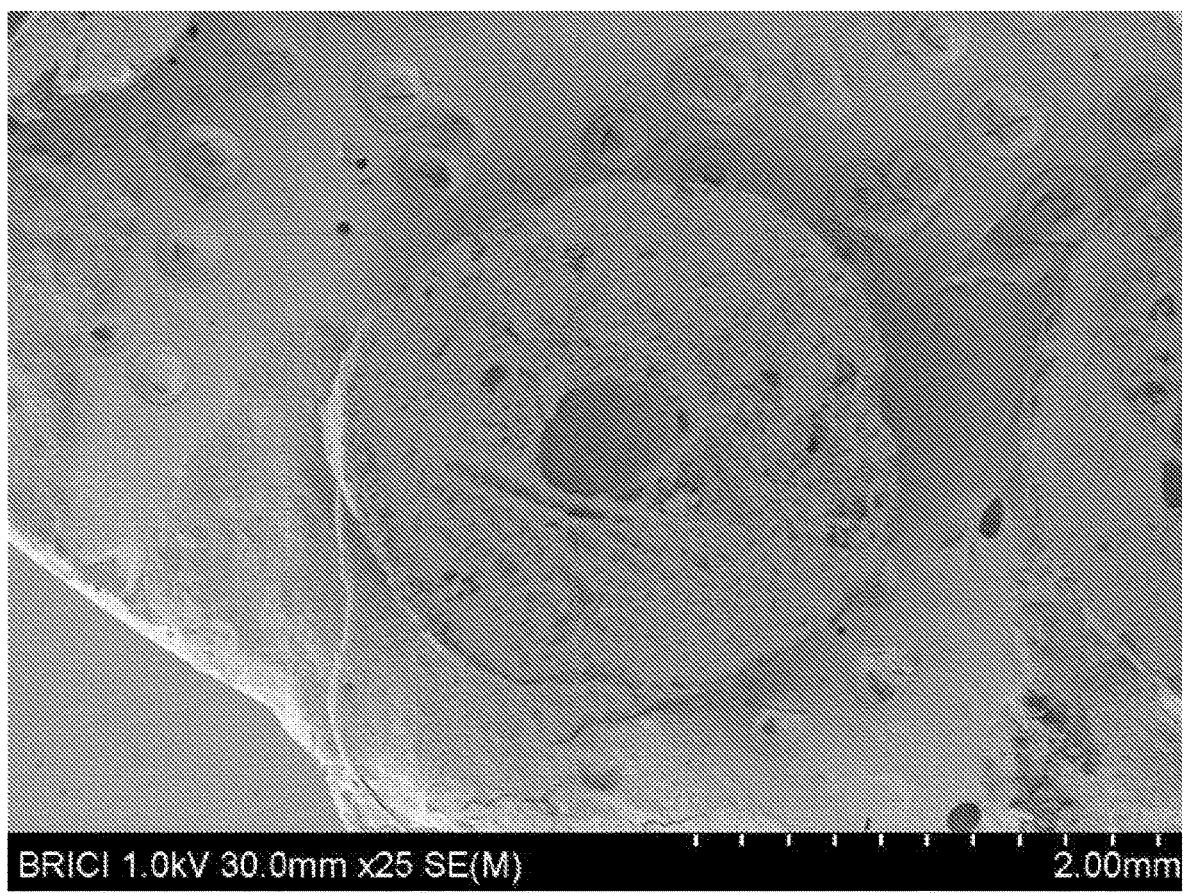
FIG. 2 is an electron micrograph of a cross-section of a spherical and/or spherical-like polymer having a cavity therein obtained in Example 2 of the present invention.

The present disclosure is described in detail in conjunction with examples below, but the present disclosure is not limited by the following examples.

The results of the present invention were characterized by the following manners.

Before the measurement, the polymer was subject to a washing treatment with an acid solution, a content of metal in the polymer≤50 ppm.

A content of comonomers in the copolymer (the structural unit of the unsaturated carboxylic acid shown in Formula I or the structural unit of the derivative of the unsaturated carboxylic acid shown in Formula I) was measured by using $^{13}C$ NMR spectrum, on a 400 MHz Bruker Avance 400 nuclear magnetic resonance spectrometer, with a 10 mm PASEX 13 probe, through dissolution of a polymer sample with deuterated tetrachloroethane at 130° C. and analysis and testing.

A molecular weight of the copolymer was measured by using PL-GPC220, with the trichlorobenzene as the solvent at 150° C. (standard sample: PS; flow velocity: 1.0 mL/min; and column: 3×Plgel 10 um M1×ED-B 300×7.5 nm).

A melting point of the copolymer was tested by using the differential scanning calorimetry (DSC). A sample of 10 mg was placed in a crucible, and is measured at a Pekin Elmer DSC 8500 differential scanning calorimeter. Under a nitrogen atmosphere, the temperature was increased from 0° C. to 180° C. at an increasing rate of 10° C./min and maintained for 1 min, and decreased to 10° C. at a rate of 10° C./min and maintained for 3 min. After that, the temperature was increased to 180° C. at the increasing rate of 10° C./min, and scanning data during the second temperature increasing was recorded.

A density of the polymer was tested by using GB/T1033-1986 and GB/T6463-2009 respectively. When the testing was performed by using GB/T1033-1986, the test object was randomly selected from the copolymerization product. In the case that the testing was performed by using GB/T6463-2009, the test object was randomly selected from the spherical and/or spherical-like polymers when the copolymer contains spherical and/or spherical-like polymers, and the test object was randomly selected from the copolymerization product when the copolymer did not contain spherical and/or spherical-like polymers.

A particle size of the spherical and/or spherical-like polymers was tested by using ASTM D1921.

Example 1

An 1 L stainless steel polymerization kettle equipped with a mechanical stirrer was continuously dried for 6 hours at 130° C., evacuated to vacuum while hot, and replaced with N2 gas for 3 times. 500 mL of hexane was injected into the polymerization system, and meanwhile 2.5 μmol (1.6 mg) of complex a1, 15 mmol (2.55 g) of 2,2-dimethyl-7-octenoic acid, 15 mL of AlEt$_3$ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 2

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.6 mg) of complex a1, 30 mmol (5.10 g) of 2,2-dimethyl-7-octenoic acid, 30 mL of AlEt$_3$ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 3 (Comparison)

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.6 mg) of complex a1, 30 mmol (5.10 g) of 2,2-dimethyl-7-octenoic acid, 30 mL of AlEt$_3$ (1.0 mol/L of hexane solution), and 3 mL of methylaluminoxane (MAO) (1.53 mol/L toluene solution) were added. The reaction was performed for 30 min by stirring at 60° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 4

An 1 L stainless steel polymerization kettle equipped with a mechanical stirrer was continuously dried for 6 hours at 130° C., evacuated to vacuum while hot, and replaced with N$_2$ gas for 3 times. 500 mL of hexane was injected into the polymerization system, and meanwhile 2.5 μmol (1.6 mg) of complex a1, 30 mmol (5.10 g) of 2,2-dimethyl-7-octenoic acid, 30 mL of AlEt$_3$ (1.0 mol/L of hexane solution), 0.25 mL diethylzinc (1 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 5

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex a1, 30 mmol (5.10 g) of 2,2-dimethyl-7-octenoic acid, 30 mL of AlEt₃ (1.0 mol/L of hexane solution), 0.5 mL diethylzinc (1 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 6 (Comparison)

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex a1, 30 mmol (5.10 g) of 2,2-dimethyl-7-octenoic acid, 30 mL of AlEt₃ (1.0 mol/L of hexane solution), and 3 mL of methylaluminoxane (MAO) (1.53 mol/L toluene solution) were added. The reaction was performed for 30 min by stirring at 80° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 7

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex a1, 50 mmol (8.51 g) of 2,2-dimethyl-7-octenoic acid, 50 mL of AlEt₃ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 8

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex a1, 100 mmol (17.02 g) of 2,2-dimethyl-7-octenoic acid, 100 mL of AlEt₃ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 9

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex a1, 30 mmol (4.69 g) of 2,2-dimethyl-7-heptenoic acid, 30 mL of AlEt₃ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 10

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.6 mg) of complex a1, 30 mmol (4.26 g) of 2-isopropyl-4-pentenoic acid, 30 mL of AlEt₃ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 11

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.5 mg) of complex b1, 30 mmol (5.10 g) of 2,2-dimethyl-7-octenoic acid, 30 mL of AlEt₃ (1.0 mol/L of hexane solution), and 3 mL of methylaluminoxane (MAO) (1.53 mol/L toluene solution) were added. The reaction was performed for 60 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 12

An 1 L stainless steel polymerization kettle equipped with a mechanical stirrer was continuously dried for 6 hours at 130° C., evacuated to vacuum while hot, and replaced with N₂ gas for 3 times. 500 mL of hexane was injected into the polymerization system, and meanwhile 2.5 µmol (1.5 mg) of complex b1, 50 mmol (8.51 g) of 2,2-dimethyl-7-octenoic acid, 50 mL of AlEt₃ (1.0 mol/L of hexane solution), and 3 mL of methylaluminoxane (MAO) (1.53 mol/L toluene solution) were added. The reaction was performed for 60 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 13

An 1 L stainless steel polymerization kettle equipped with a mechanical stirrer was continuously dried for 6 hours at 130° C., evacuated to vacuum while hot, and replaced with $N_2$ gas for 3 times. 500 mL of hexane was injected into the polymerization system, and meanwhile 2.5 μmol (1.4 mg) of complex c1, 30 mmol (5.10 g) of 2,2-dimethyl-7-octenoic acid, 30 mL of $AlEt_3$ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 14

An 1 L stainless steel polymerization kettle equipped with a mechanical stirrer was continuously dried for 6 hours at 130° C., evacuated to vacuum while hot, and replaced with $N_2$ gas for 3 times. 500 mL of hexane was injected into the polymerization system, and meanwhile 2.5 μmol (1.6 mg) of complex a1, 30 mmol (5.10 g) of 2,2-dimethyl-7-octenoic acid, 30 mL of $AlEt_3$ (1.0 mol/L of hexane solution) were added; and 2.5 mL of toluene solution containing N, N-dimethylanilinium tetrakis (pentafluorophenyl) borate (1 mmol/L toluene solution) was added, making Ni/B=1. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 15

An 1 L stainless steel polymerization kettle equipped with a mechanical stirrer was continuously dried for 6 hours at 130° C., evacuated to vacuum while hot, and replaced with $N_2$ gas for 3 times. 500 mL of hexane was injected into the polymerization system, and meanwhile 2.5 μmol (1.6 mg) of complex a1, 30 mmol (5.10 g) of 2,2-dimethyl-7-octenoic acid, 30 mL of $AlEt_3$ (1.0 mol/L of hexane solution), and 3 mL of $AlEt_2Cl$ (2 mmol/L hexane solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Example 16

An 1 L stainless steel polymerization kettle equipped with a mechanical stirrer was continuously dried for 6 hours at 130° C., evacuated to vacuum while hot, and replaced with $N_2$ gas for 3 times. 500 mL of hexane was injected into the polymerization system, and meanwhile 5.0 μmol (3.2 mg) of complex a1, 30 mmol (5.10 g) of 2,2-dimethyl-7-octenoic acid, 30 mL of $AlEt_3$ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

Comparative Example 1

An 1 L stainless steel polymerization kettle equipped with a mechanical stirrer was continuously dried for 6 hours at 130° C., evacuated to vacuum while hot, and replaced with $N_2$ gas for 3 times. 500 mL of toluene was injected into the polymerization system, and meanwhile 2.5 μmol (1.6 mg) of complex a1, 30 mmol (5.10 g) of 2,2-dimethyl-7-octenoic acid, 30 mL of $AlEt_3$ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 1% by volume hydrochloric acid was used for neutralization so as to obtain the polymer. Polymerization activity and performance parameters of the polymer are shown in Table 1.

Comparative Example 2

An 1 L stainless steel polymerization kettle equipped with a mechanical stirrer was continuously dried for 6 hours at 130° C., evacuated to vacuum while hot, and replaced with $N_2$ gas for 3 times. 500 mL of hexane was injected into the polymerization system, and meanwhile 2.5 μmol (1.6 mg) of complex a1, 30 mmol (5.53 g) of 10-undecylenic acid, 30 mL of $AlEt_3$ (1.0 mol/L of hexane solution), and 3 mL of methylaluminoxane (MAO) (1.53 mol/L toluene solution) were added. The reaction was performed for 30 min by stirring at 30° C. and at an ethylene pressure of 10 atm. Finally, an ethanol solution acidified with 20% by volume hydrochloric acid was used for neutralization so as to obtain the polymer. Polymerization activity and performance parameters of the polymer are shown in Table 1.

TABLE 1

| Serial Number | Complex | Polymerization Activity $10^6$ g/mol Ni/h | Mn (ten thousand) | Comonomer Content (mol %) | Melting Point (° C.) | Whether there are spherical and/or spherical-like polymers in the copolymer | Density[a] (g · $cm^{-3}$) | Density[b] (g · $cm^{-3}$) | Average particle size of the spherical and/or spherical-like polymers (mm) |
|---|---|---|---|---|---|---|---|---|---|
| Example 1 | a1 | 11.2 | 10.4 | 0.52 | 117.3 | Yes | 0.965 | 0.672 | 1.4 |
| Example 2 | a1 | 15.8 | 11.7 | 0.94 | 119.8 | Yes | 0.975 | 0.675 | 1.2 |
| Example 3 | a1 | 14.7 | 7.1 | 0.91 | 60.2 | No | 0.952 | 0.940 | — |
| Example 4 | a1 | 9.4 | 8.0 | 0.93 | 118.0 | Yes | 0.975 | 0.672 | 1.1 |
| Example 5 | a1 | 7.6 | 6.1 | 0.94 | 118.4 | Yes | 0.975 | 0.672 | 1.0 |
| Example 6 | a1 | 8.8 | 2.8 | 0.72 | — | No | 0.924 | 0.912 | — |
| Example 7 | a1 | 18.6 | 12.8 | 1.73 | 120.1 | Yes | 0.980 | 0.677 | 1.2 |
| Example 8 | a1 | 12.4 | 11.2 | 3.33 | 119.8 | Yes | 0.984 | 0.678 | 1.0 |
| Example 9 | a1 | 14.5 | 12.0 | 0.94 | 120.2 | Yes | 0.976 | 0.726 | 0.7 |

TABLE 1-continued

| Serial Number | Complex | Polymerization Activity 10⁶ g/mol Ni/h | Mn (ten thousand) | Comonomer Content (mol %) | Melting Point (° C.) | Whether there are spherical and/or spherical-like polymers in the copolymer | Density$^a$ (g · cm$^{-3}$) | Density$^b$ (g · cm$^{-3}$) | Average particle size of the spherical and/or spherical-like polymers (mm) |
|---|---|---|---|---|---|---|---|---|---|
| Example 10 | a1 | 11.7 | 8.3 | 0.92 | 118.9 | Yes | 0.974 | 0.768 | 1.1 |
| Example 11 | b1 | 18.6 | 5.9 | 1.02 | 122.3 | Yes | 0.980 | 0.705 | 0.8 |
| Example 12 | b1 | 21.6 | 6.8 | 2.07 | 123.4 | Yes | 0.986 | 0.710 | 0.7 |
| Example 13 | c1 | 14.4 | 11.8 | 0.92 | 119.1 | Yes | 0.975 | 0.674 | 1.3 |
| Example 14 | a1 | 13.1 | 10.7 | 1.04 | 119.2 | Yes | 0.975 | 0.675 | 1.1 |
| Example 15 | a1 | 8.4 | 6.7 | 0.73 | 119.0 | Yes | 0.975 | Nd | 0.8 |
| Example 16 | a1 | 14.2 | 6.3 | 0.92 | 119.7 | Yes | 0.975 | 0.650 | 2.5 |
| Comparative Example 1 | a1 | 16.7 | 11.8 | 0.96 | 119.8 | No | 0.975 | 0.958 | — |
| Comparative Example 2 | a1 | 15.7 | 10.7 | 0.83 | 119.4 | No | 0.975 | 0.964 | — |

Density$^a$ (g · cm$^{-3}$) is tested by using GB/T1033-1986.
Density$^b$ (g · cm$^{-3}$) is tested by using GB/T6463-2009.

It should be noted that the embodiments described above are only used to explain the present disclosure, and do not constitute any limitation to the present disclosure. The present disclosure has been described with reference to exemplary embodiments, but it should be understood that words used herein are descriptive and explanatory words, not limiting words. Modifications can be made to the present disclosure within the scope of the claims of the present disclosure according to provisions, and revisions can be made to the present disclosure without departing from the scope and spirit of the present disclosure. Although the present disclosure described relates to specific methods, materials, and embodiments, it does not mean that the present disclosure is limited to the specific examples disclosed herein, but rather the present disclosure can be extended to all other methods and applications having the same function.

The invention claimed is:

1. A preparation method for a copolymer, comprising:
in a reaction system, contacting a C$_2$-C$_{16}$ α-olefin and an unsaturated carboxylic acid of Formula II or a derivative of the unsaturated carboxylic acid of Formula II with a catalyst and optionally a chain transfer agent for reaction in the presence of an alkane solvent to obtain the copolymer,

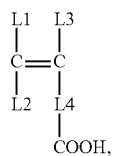

Formula II wherein in the Formula II, each of L1, L2, and L3 is independently selected from the group consisting of H and C$_1$-C$_{30}$ alkyl, and L4 is a C$_1$-C$_{30}$ alkylene having a side group selected from the group consisting of C$_6$-C$_{20}$ aryl, C$_1$-C$_{20}$ alkyl, and C$_1$-C$_{20}$ alkoxy, and wherein the catalyst comprises a main catalyst and a co-catalyst, and the main catalyst is selected from at least one metal complex of Formula V:

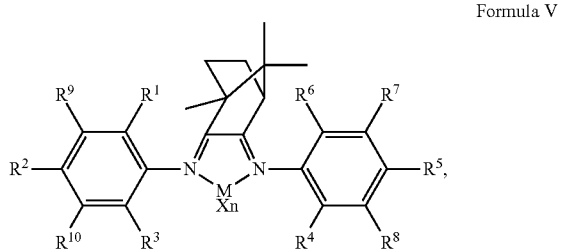

Formula V wherein in the Formula V, R$^7$-R$^{10}$ are H, and R$^1$-R$^6$ are identical to or different from each other and each independently selected from the group consisting of H and C$_1$-C$_6$ alkyl,
M is nickel,
X is a halogen,
n is 2,
wherein the reaction is carried out at a reaction temperature in a range from 0° C. to 50° C.,
wherein the co-catalyst is selected from the group consisting of an organic aluminum compound and an organic boron compound, and wherein the produced copolymer is in the form of spherical and/or spherical-like particles, at least part of the spherical and/or spherical-like particles of the copolymer have a cavity therein.

2. The preparation method according to claim 1, wherein in Formula V, R$^7$-R$^{10}$ are H, and R$^1$-R$^6$ are identical to or different from each other and each is independently selected from the group consisting of H and C$_1$-C$_3$ alkyl.

3. The preparation method according to claim 1, wherein the organic aluminum compound is one or more selected from the group consisting of alkyl aluminoxane, alkylaluminum, and alkylaluminum halides; and
the organic boron compound is selected from the group consisting of aryl boron and borate.

4. The preparation method according to claim 1, wherein a concentration of the main catalyst in a reaction system is 0.00001-100 mmol/L; when the co-catalyst is the organic aluminum compound, a molar ratio of aluminum in the co-catalyst and M in the main catalyst is (10-10000000):1;

and when the co-catalyst is the organic boron compound, a molar ratio of boron in the co-catalyst and M in the main catalyst is (0.1-1000):1.

5. The preparation method according to claim 1, wherein the chain transfer agent is present in the reaction system and is one or more selected from the group consisting of aluminum alkyl, magnesium alkyl, and zinc alkyl, and a molar ratio of the chain transfer agent and M in the main catalyst is (0.1-2000):1.

6. The preparation method according to claim 1, wherein a concentration of the unsaturated carboxylic acid of Formula II or the unsaturated carboxylic acid derivative of Formula II in the reaction system is 0.01-6000 mmol/L.

7. The preparation method according to claim 1, wherein the reaction is carried out for 10-200 min.

8. The preparation method according to claim 1, wherein the copolymer has a number-average molecular weight of 5000-200000.

9. The preparation method according to claim 1, wherein a volume of the cavity in the number of the spherical and/or spherical-like particles of the copolymer having a cavity therein is 5-99% of a volume of the spherical and/or spherical-like particles of the copolymer.

10. The preparation method according to claim 9, wherein the spherical and/or spherical-like particles of the copolymer have a density of 0.3000-0.8500 g/cm³, measured according to GB/T6343-2009.

11. The preparation method according to claim 9, wherein an average particle size of the spherical and/or spherical-like particles of the copolymer is 0.1-50.0 mm.

12. The preparation method according to claim 9, wherein the produced copolymer comprises a structural unit derived from the $C_2$-$C_{16}$ α-olefin and a structural unit of Formula I or a structural unit of a derivative of the Formula I,

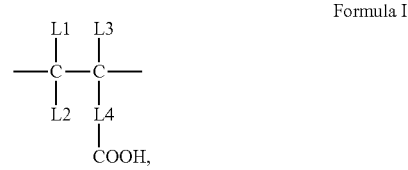

Formula I wherein, in the Formula I, each of L1, L2, and L3 is independently selected from the group consisting of H and $C_1$-$C_{30}$ alkyl, and L4 is a $C_1$-$C_{30}$ alkylene having a side group selected from the group consisting of $C_6$-$C_{20}$ aryl, $C_1$-$C_{20}$ alkyl, and $C_1$-$C_{20}$ alkoxy, and the derivative of the Formula I is a IIA, IIIA or IIB Group metal salt of the Formula I.

13. The preparation method according to claim 12, wherein, in the copolymer, a content of the structural unit of Formula I or the structural unit of the derivative of Formula I is 0.2-15.0 mol %.

14. The preparation method according to claim 12, wherein, in Formula I, L1 and L2 are H, L3 is selected from the group consisting of H and $C_1$-$C_{10}$ alkyl and L4 is a $C_1$-$C_{10}$ alkylene having a side group selected from the group consisting of $C_6$-$C_{10}$ aryl and $C_1$-$C_{10}$ alkyl.

* * * * *